(12) United States Patent
Chappell

(10) Patent No.: US 6,785,698 B2
(45) Date of Patent: Aug. 31, 2004

(54) INSTANCE-REDUCTION ALGORITHM FOR GARBAGE-COLLECTED LANGUAGE

(75) Inventor: Thomas Chappell, Sunland, CA (US)

(73) Assignee: Alcatel, Paris (FR)

( * ) Notice: Subject to any disclaimer, the term of this patent is extended or adjusted under 35 U.S.C. 154(b) by 406 days.

(21) Appl. No.: 10/055,053

(22) Filed: Jan. 23, 2002

(65) Prior Publication Data

US 2002/0165994 A1 Nov. 7, 2002

Related U.S. Application Data

(60) Provisional application No. 60/288,529, filed on May 2, 2001.

(51) Int. Cl.[7] .............................................. G06F 17/30
(52) U.S. Cl. ................................... 707/206; 707/103 R
(58) Field of Search ................................ 707/102, 200, 707/206, 103 R, 104.1; 711/100; 714/38; 717/114, 137, 152

(56) References Cited

U.S. PATENT DOCUMENTS 5,765,174 A * 6/1998 Bishop ........................ 707/206
6,237,060 B1 * 5/2001 Shilts et al. ................. 711/100
6,473,773 B1 * 10/2002 Cheng et al. ................ 707/200
6,701,520 B1 * 3/2004 Santosuosso et al. ........ 717/152
6,721,942 B1 * 4/2004 Sievert ........................ 717/137

FOREIGN PATENT DOCUMENTS

EP           1255191 A2 * 11/2002 ............. G06F/9/44

* cited by examiner

Primary Examiner—Diane D. Mizrahi
Assistant Examiner—Apu Mofiz
(74) Attorney, Agent, or Firm—Michael Blaine Brooks, P.C.; David A. Cordeiro; V. Lawrence Sewell

(57) ABSTRACT

A system and method for reducing object instances and making efficient use of memory. A WeakHashMap class provided by the Java programming language is utilized to maintain a map of unique objects in memory. When a new candidate object is presented, the map is searched for an equivalent object instance and returned for use if found. If an equivalent object instance is not found, the new candidate object is unique, and is therefore added to the map. Each entry of the map stores key and value pairs. In adding the new candidate object to the map, the key portion of the entry is set to the new candidate object. The value portion of the entry is set to a weak reference which also refers to the new candidate object. Once an object in the map is no longer in use, the object is automatically purged from the memory by making use of automatic garbage collection capabilities provided by Java.

20 Claims, 5 Drawing Sheets

INSTANCE-REDUCTION ALGORITHM FOR GARBAGE-COLLECTED LANGUAGE

CROSS-REFERENCE TO RELATED APPLICATION(S)

This application claims the benefit of U.S. provisional application No. 60/288,529, filed May 2, 2001, the content of which is incorporated herein by reference.

FIELD OF THE INVENTION

This invention relates generally to providing efficient use of memory, and more particularly, to an efficient method of reducing object instances created via a Java programming language.

BACKGROUND OF THE INVENTION

In object oriented programming languages, such as Java, developed by Sun Microsystems, Inc., there may be multiple instances of equivalent objects that unnecessarily take up memory and disk space. Because objects are often large, it is desirable to maintain only one shared instance of an object in memory rather than multiple separate instances of equivalent objects. It is also desirable to allow garbage collection of an object instance if it is no longer in use.

One instance-reduction mechanism creates a dictionary of objects that have been used, and if a desired object exists in the dictionary, a reference is made to the dictionary object instead of creating a new object instance. The dictionary may be rebuilt on a periodic basis, purging objects that are no longer in use. One drawback with this solution is that it makes inefficient use of memory by having to maintain unused objects until the next purge cycle.

Another instance-reduction mechanism is maintaining, along with the dictionary of objects that have been used, a reference count for each object. The reference count increases as the number of references to the dictionary object increases, and decreases as the number of references to the dictionary object decreases. Instead of waiting for the next purge cycle, the object is removed from the dictionary when the reference count becomes zero. Although this instance-reduction mechanism may allow a more expeditious purging of unused objects, the maintaining of reference counts is often cumbersome and complex.

A further instance-reduction mechanism is compressing the set of objects being maintained in memory using standard compression algorithms. This mechanism also has its drawbacks in that the compressed objects must generally be decompressed prior to their use, adding a layer of complexity to the mechanism. Once decompressed, the objects immediately use up any memory space saved by the compression.

Accordingly, there is a need for a simpler instance-reduction mechanism that makes efficient use of memory. Such a mechanism should utilize the automatic garbage collection functionality provided by the Java programming language to allow the automatic purging of unused objects without requiring the maintenance of reference counts for the objects.

SUMMARY OF THE INVENTION

The present invention is directed to an efficient method for avoiding multiple instances of equivalent objects and making efficient use of memory. Instead of creating a new object instance each time an candidate object is presented, a map of unique objects is searched for an equivalent object instance and returned for use if found. If an equivalent object instance is not found, the candidate object is unique, and is therefore added to the map. Once an object in the map is no longer in use, the object is automatically purged from the memory.

In one embodiment, the invention is directed to a method for reducing object instances stored in memory. The method includes receiving an object and searching for an equivalent object stored in a map. The map includes a plurality of entries, each entry including a key and a value. The object is stored in an entry of the map if the search is unsuccessful. In storing the object, the key for the entry is set to the object for causing the object to be stored as a referent of a first weak reference and the value for the entry is set to a second weak reference for storing the object as a referent of the second weak reference.

In another embodiment, the method for reducing object instances includes storing an object in an entry of a map having a key and a value if the object is not found in the map, the key for the entry being set to the object and the value for the entry being set to a weak reference to the object, and automatically deleting the object from the map if the object is no longer is use.

In a further embodiment, the method for reducing object instances includes receiving an object, searching for an equivalent object stored in a map, storing the object in an entry of the map as a referent of a weak reference if the search is unsuccessful, determining if the object has become weakly reachable, and automatically deleting the object from the map if the object has become weakly reachable.

In a further embodiment, the invention is directed to an object oriented programming system that includes a memory storing a map having a plurality of entries, each entry including a key and a value, and an instance reduction engine coupled to the memory. The instance reduction engine receives an object, searches the map for an equivalent object, and stores the object in an entry of the map if the search is unsuccessful. In storing the object, the key for the entry is set to the object for causing the object to be stored as a referent of a first weak reference and the value for the entry is set to a second weak reference for storing the object as a referent of the second weak reference.

In another embodiment, the present invention is directed to an object oriented programming system that further includes a garbage collection unit coupled to the memory. The garbage collection unit automatically deletes the object from the map if the object is no longer is use.

In one embodiment, the map storing the unique objects is a WeakHashMap provided by the Java programming language.

In another embodiment, the automatic deletion of objects no longer in use is enabled by the garbage collection capabilities provided by the Java programming language.

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION OF THE SPECIFIC EMBODIMENTS

Figure 1:
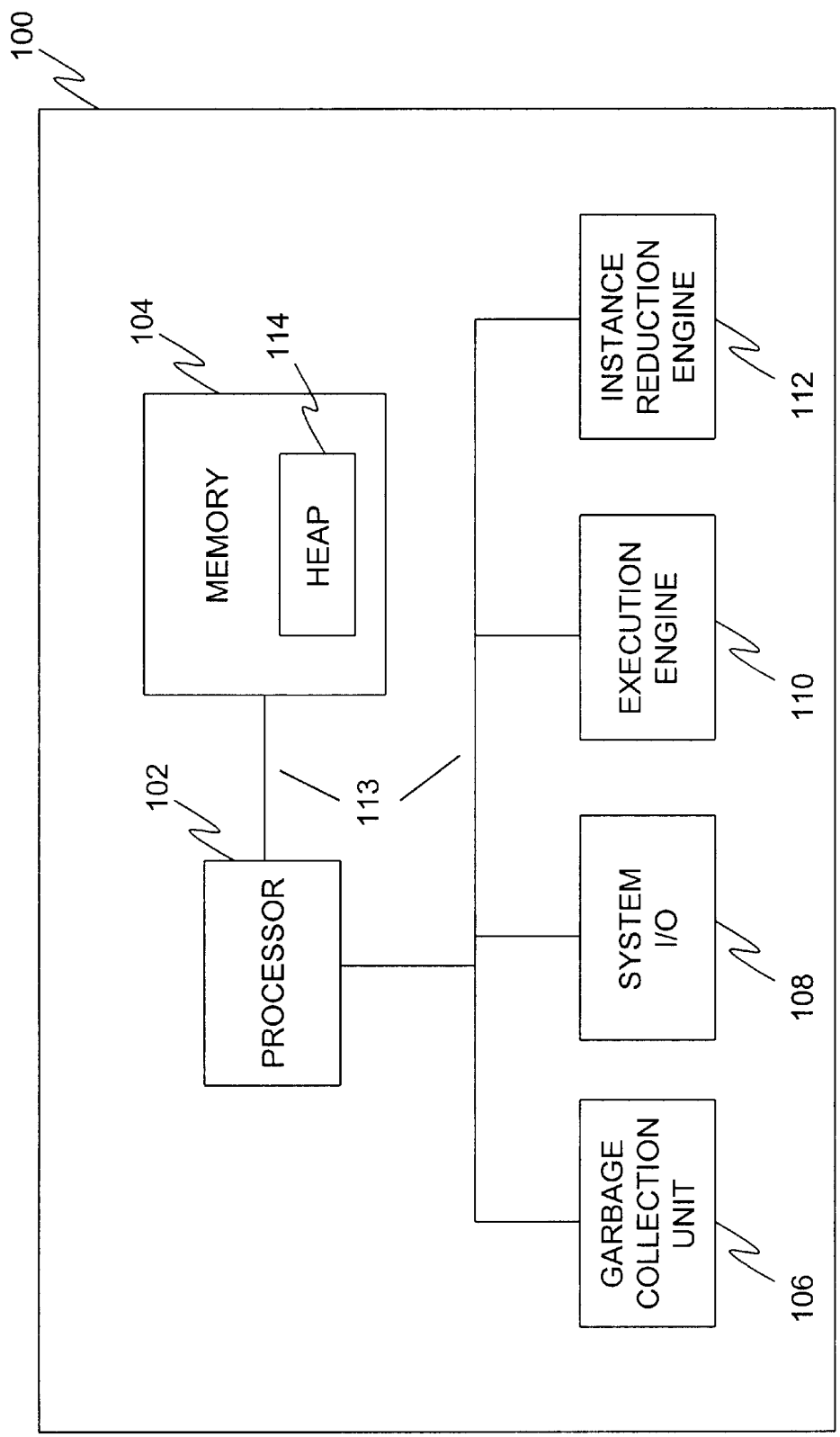
FIG. 1 is a schematic block diagram of a computer system in which an embodiment of the present invention may be implemented.

FIG. 1 is a schematic block diagram of a computer system 100 in which an embodiment of the present invention may be implemented. The computer system 100 may be part of a network such as a local-area network or a wide-area network, and may be executed under a number of different operating systems conventional in the art. The computer system 100 may also be viewed as a Java virtual machine which is well known to those skilled in the art.

The computer system 100 preferably includes a processor 102, a memory 104, a garbage collection unit 106, an input/output 108, an execution engine 110, and an instance reduction engine 112. The processor 102 is coupled to the memory 104, garbage collection unit 106, input/output 108, execution engine 110, and instance reduction engine 112, via a system bus 113.

The input/output 108 preferably allows the loading of desired Java class files during execution of a Java application program. The execution engine 110 allows execution of instructions contained in methods of loaded class files.

The memory 104 preferably includes a heap 114 used to store Java components such as, for example, object instances. When a unique object instance is created in a running Java application program, memory for the object instance is allocated from the heap 114.

The garbage collection unit 106 preferably includes instructions provided by the Java programming language for managing the heap 114. The garbage collection unit 106 identifies objects in the heap 114 that are no longer in use, and reclaims the memory.

In the Java programming language, an object is in use if it can be accessed, or reached, by a Java program in its current state. The interactions with the garbage collection unit vary based on the strength of an object's reachability. When an object is reachable from a root set of ordinary references in the Java application program, the object is said to be strongly reachable. If, however, the only ways to reach an object involve at least one weak reference object provided by Java, the object is said to be weakly reachable. An object is considered by the garbage collection unit 106 to be in use if it is strongly reachable. Weakly reachable objects are eligible for garbage collection. Additional details on reachability and garbage collection is provided by Monica Pawlan, "Reference Objects and Garbage Collection," java.sun.com, August 1998, the content of which is incorporated herein by reference.

The instance reduction engine 112 allows single instances of an object to be maintained in the heap 114. This may be useful, for instance, to reduce the number of instances of equivalent trap data produced by a trap system in a data communication network.

According to one embodiment of the present invention, a hashtable-based map is created to maintain the unique objects in the heap 114. When a candidate for a new object instance is presented, the instance reduction engine compares the candidate against the objects already stored in the map, and the new object instance is not created if an equivalent object already exists. Otherwise, the new object instance is created and added to the map.

The garbage collection capabilities of the garbage collection unit 106 is utilized to automatically purge objects from the map that are no longer in use. This is preferably accomplished by maintaining weak references to the objects in the map, making them automatically eligible for garbage collection according to the Java programming language.

Figure 2:
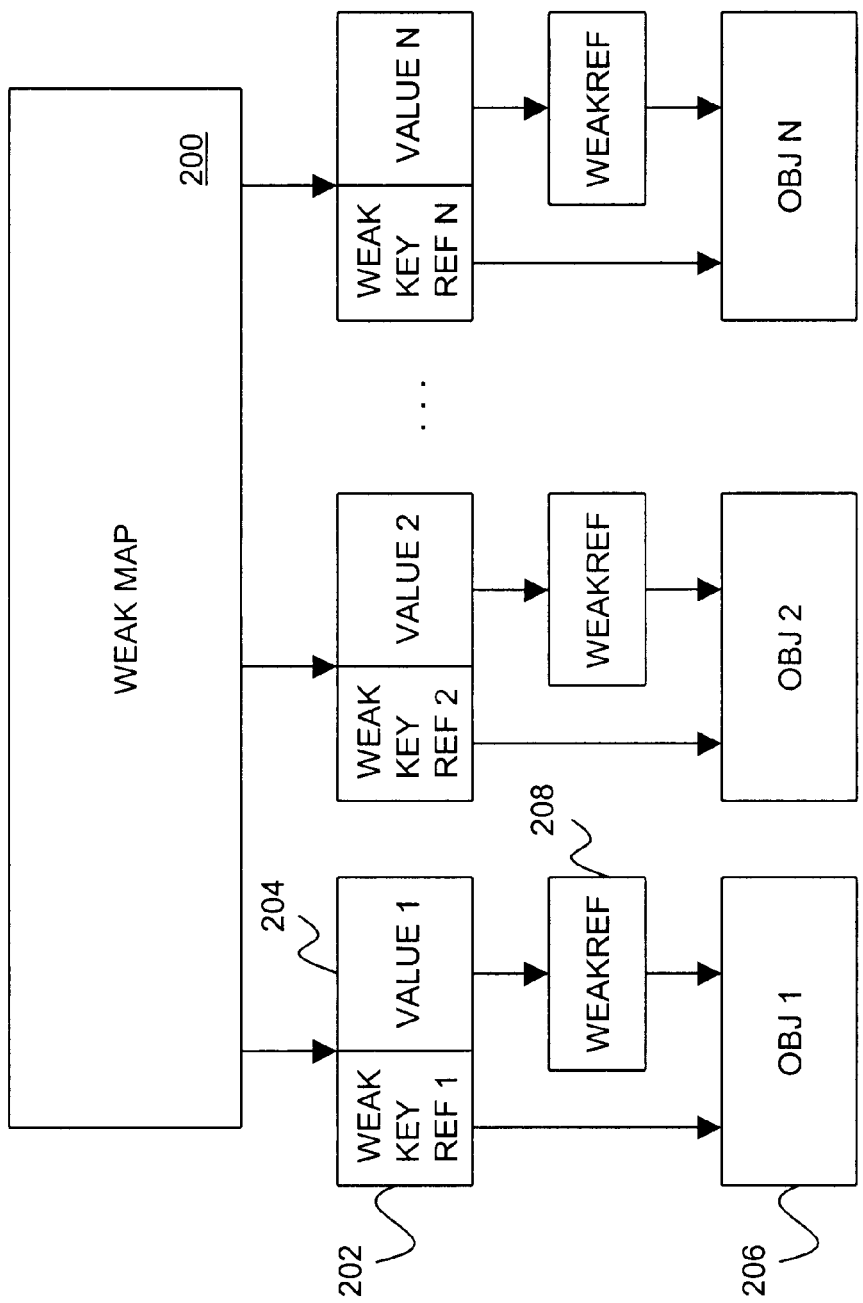
FIG. 2 is a layout diagram of a weak map storing unique object instances according to one embodiment of the invention.

FIG. 2 is a layout diagram of a weak map 200 storing unique object instances according to one embodiment of the invention. The weak map 200 is preferably implemented as a WeakHashMap object provided by the Java programming language. Details of the WeakHashMap class is provided in the Java Platform Std. Ed. v.1.3, available from java.sun.com, the content of which is incorporated herein by reference.

Each entry of the weak map 200 stores a key object 202 that is set to a unique object 206. By setting the key object 202 to the unique object, the WeakHashMap class allows the unique object 206 to be stored indirectly as a referent of a weak reference that is internal to the WeakHashMap class.

Each key object 202 is preferably associated with a value 204 also stored in each entry of the weak map 200. The WeakHashMap class allows values to be of any type provided by the Java programming language. According to one embodiment of the invention, the value 204 is preferably implemented as a weak reference 208 that refers back to the stored unique object 206.

Because each unique object 206 is referenced by a weak reference from both the key and value sides of the weak map 200, the garbage collection unit 106 automatically garbage collects the unique object 206 once it becomes weakly reachable, that is, once no strong references are made to the object.

Figure 3:
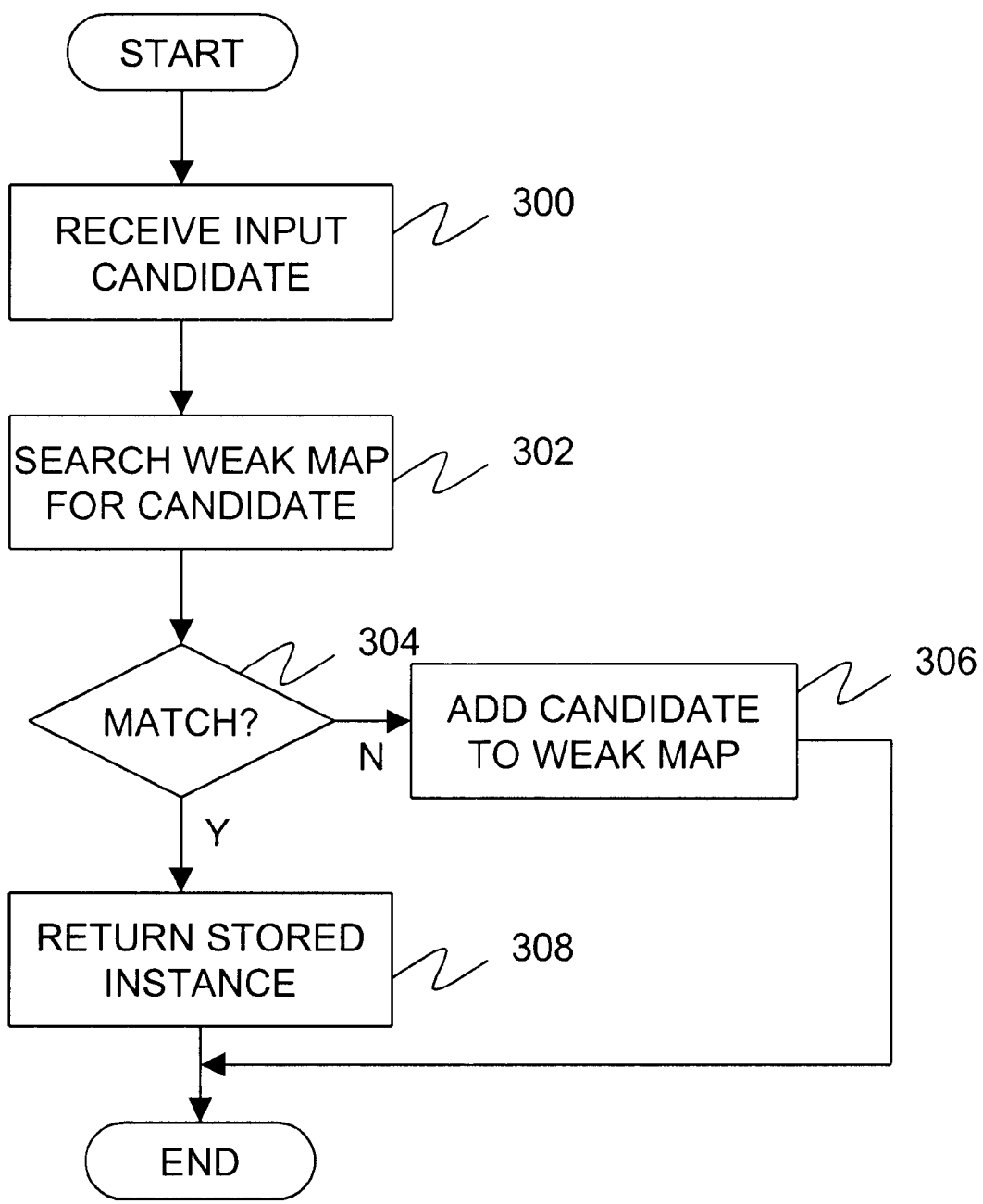
FIG. 3 is a generalized flow diagram of a process for reducing object instances according to one embodiment of the invention.

FIG. 3 is a generalized flow diagram of a process for reducing object instances according to one embodiment of the invention. The process starts, and in step 300, the instance reduction engine 112 receives an input candidate for a new object instance. In step 302, the instance reduction engine 112 searches the weak map 200 for the input candidate. In step 304, a determination is made if a match has been found. If the answer is YES, the stored instance is returned. If the answer is NO, the candidate is added to the weak map 200 and returned.

Figure 4:
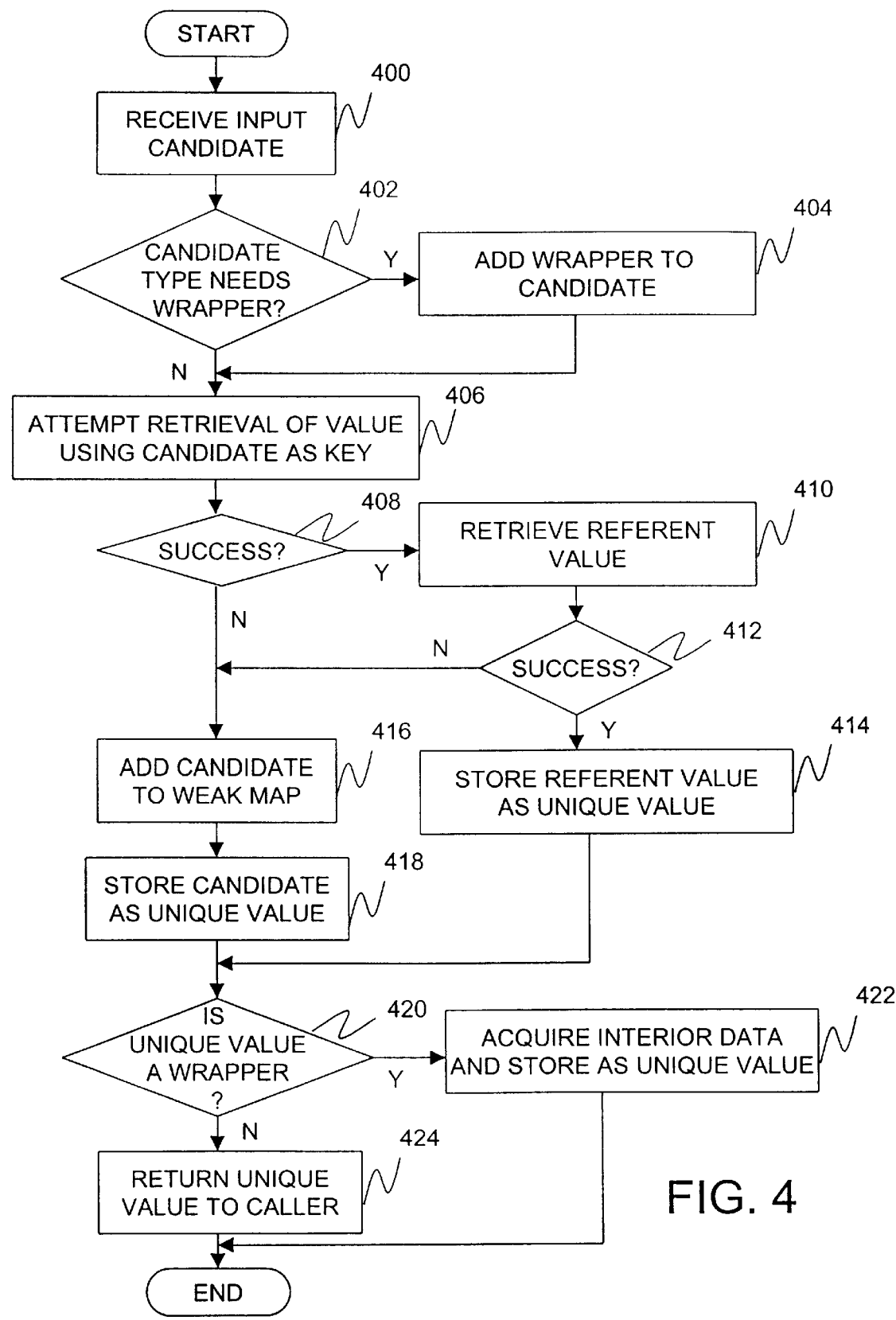
FIG. 4 is a more detailed flow diagram of a process for reducing object instances according to one embodiment of the invention.

FIG. 4 is a more detailed flow diagram of a process for reducing object instances according to one embodiment of the invention. The process is preferably implemented as a software program written in the Java programming language executing within the instance reduction engine 112.

The process starts, and in step 400, the instance reduction engine 112 receives an input candidate for a new object instance. In step 402, the instance reduction engine 112 determines if the candidate type is of a type that is known not to meaningfully implement the equals ( ) and hashcode ( ) methods provided by the Java programming language, and therefore needs to be wrapped in an object that does sensibly implement these methods. If the answer is YES, an appropriate wrapper is added to the candidate in step 404.

In step 406, the instance reduction engine 112 searches the weak map 200 using the input candidate as the key object, and attempts to retrieve an associated value. In step 408, a determination is made if a value has been successfully retrieved. If the answer is YES, the retrieved value is a weak reference. Accordingly, the instance reduction engine 112 attempts to retrieve, in step 410, the unique object instance stored as the referent of the weak reference. If the retrieval is successful, as determined in step 412, the referent value is set as a unique value in step 414.

Referring again to step 408, if no value is retrieved from the weak map 200 after using the candidate as the key object, the candidate is a unique object which is added to the weak map in step 416. In this regard, an entry is created in the weak map 200 where the key is set to the candidate, and the value is set as a weak reference to the candidate, allowing the garbage collection unit 106 to automatically purge the candidate when it is no longer in use.

In step 418, the candidate object is set as a unique value. In step 420, a determination is made as to whether the unique value is a wrapper object. If the answer is YES, the interior data contains the ultimate candidate object. The interior data is retrieved in step 422 and stored as the unique value. In step 424, the unique value is returned.

Figure 5:
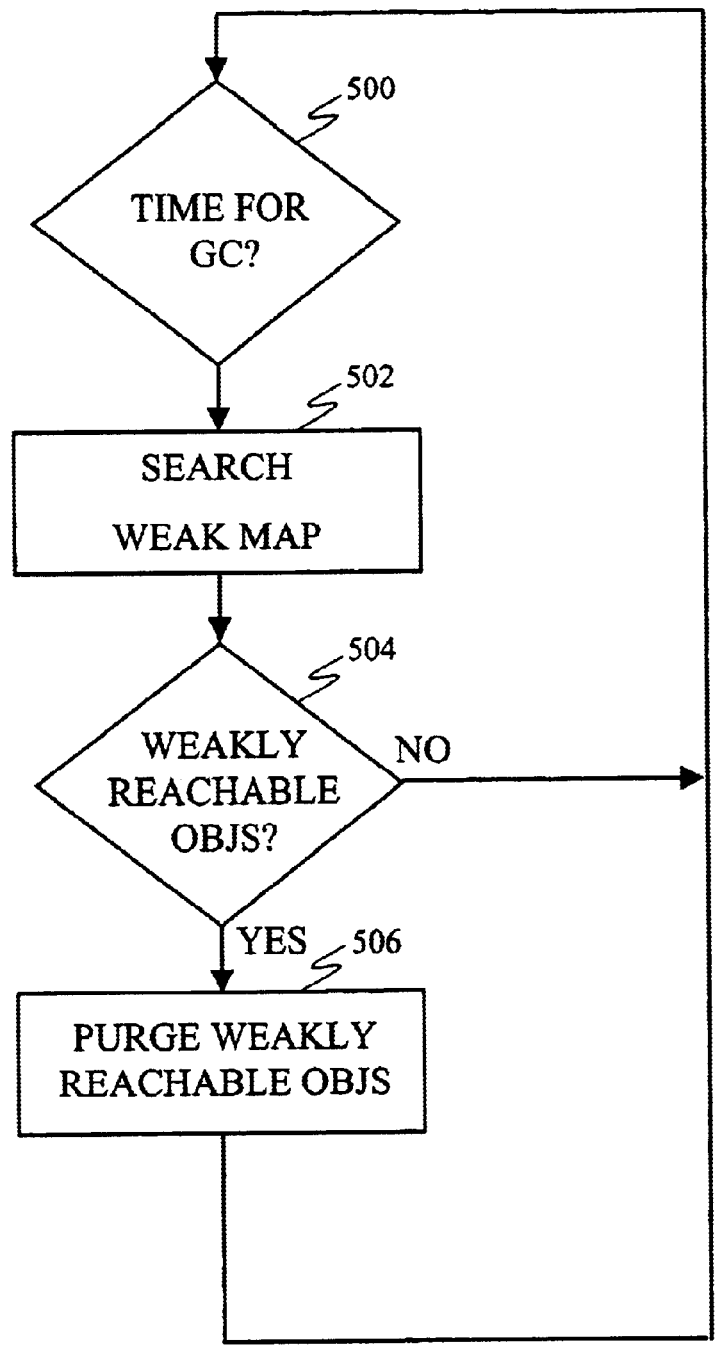
FIG. 5 is a flow diagram of a garbage collection process carried out by a garbage collection unit according to one embodiment of the invention.

FIG. 5 is a flow diagram of a garbage collection process carried out by the garbage collection unit according to one embodiment of the invention. The process is preferably automatically provided by the Java programming language, without the necessity of explicitly programming the instance reduction engine 112 to implement the garbage collection.

The process starts, and in step 500, a determination is made if it is time for garbage collection. If the answer is YES, the garbage collection unit 106 is invoked, in step 502, for searching the weak map to identify objects that are deemed to be weakly reachable. Weakly reachable objects are only reached via a weak reference object.

In step 504, a determination is made as to whether any weakly reachable objects have been found. If the answer is YES, the object is purged from the weak map, in step 506, reclaiming the memory occupied by the object.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. In an object oriented programming environment, a method for reducing object instances stored in memory, the method comprising:

receiving an object;

searching for an equivalent object stored in a map having a plurality of entries, each entry including a key and a value; and storing the object in an entry of the map if the search is unsuccessful, the key for the entry being set to the object for causing the object to be stored as a referent of a first weak reference and the value for the entry being set to a second weak reference for storing the object as a referent of the second weak reference.

2. The method of claim 1 further comprising returning the equivalent object stored in the map if the search of the map is successful.

3. The method of claim 1, wherein the map is an instance of a WeakHashMap class.

4. The method of claim 1 further comprising reclaiming a portion of the memory occupied by the object if the object is not in use.

5. The method of claim 4, wherein the object is not in use if the object is weakly reachable.

6. In an object oriented programming environment, a method for reducing object instances stored in memory, the method comprising:

storing an object in an entry of a map having a key and a value if the object is not found in the map, the key for the entry being set to the object and the value for the entry being set to a weak reference to the object; and automatically deleting the object from the map if the object is no longer is use.

7. The method of claim 6 further comprising returning an equivalent object stored in the map if the object is found in the map.

8. The method of claim 6, wherein the map is an instance of a WeakHashMap class.

9. The method of claim 6, wherein the object is not in use if the object is weakly reachable.

10. In an object oriented programming environment, a method for reducing object instances stored in memory, the method comprising:

receiving an object;

searching for an equivalent object stored in a map;

storing the object in an entry of the map as a referent of a weak reference if the search is unsuccessful;

determining if the object has become weakly reachable; and automatically deleting the object from the map if the object has become weakly reachable.

11. The method of claim 10, wherein the map is an instance of a WeakHashMap class.

12. An object oriented programming system comprising:

a memory storing a map having a plurality of entries, each entry including a key and a value; and an instance reduction engine coupled to the memory, characterized in that the instance reduction engine receives an object, searches the map for an equivalent object, and stores the object in an entry of the map if the search is unsuccessful, the key for the entry being set to the object for causing the object to be stored as a referent of a first weak reference and the value for the entry being set to a second weak reference for storing the object as a referent of the second weak reference.

13. The system of claim 12 further characterized in that the instance reduction engine returns the equivalent object stored in the map if the search is successful.

14. The system of claim 12, wherein the map is an instance of a WeakHashMap class.

15. The system of claim 12 further comprising a garbage collection unit coupled to the memory, characterized in that the garbage collection unit reclaims a portion of the memory occupied by the object if the object is not in use.

16. The system of claim 15, wherein the object is not in use if the object is weakly reachable.

17. An object oriented programming system comprising:

a memory storing a map having a plurality of entries, each entry including a key and a value; and an instance reduction engine coupled to the memory, characterized in that the instance reduction engine stores an object in an entry of the map if the object is not found in the map, the key for the entry being set to the object and the value for the entry being set to a weak reference to the object; and a garbage collection unit coupled to the memory, the garbage collection unit automatically deleting the object from the map if the object is no longer is use.

18. The system of claim 17 further characterized in that the instance reduction engine returns an equivalent object stored in the map if the object is found in the map.

19. The system of claim 17, wherein the map is an instance of a WeakHashMap class.

20. The system of claim 17, wherein the object is no longer in use if the object is weakly reachable.

* * * * *